(12) United States Patent
Kim

(10) Patent No.: US 6,314,528 B1
(45) Date of Patent: Nov. 6, 2001

(54) COMPUTER FOR TERMINATING POWER WITHOUT THE LOSS OF DATA AND A METHOD THEREOF

(75) Inventor: Jeong-Seok Kim, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/198,405

(22) Filed: Nov. 24, 1998

(30) Foreign Application Priority Data

Nov. 24, 1997 (KR) .................................................. 97-62327

(51) Int. Cl.[7] .................................................. G06F 11/00
(52) U.S. Cl. .............................................. 714/24; 713/330
(58) Field of Search .......................... 714/14, 24; 713/2, 713/330, 340, 300

(56) References Cited

U.S. PATENT DOCUMENTS

| | | | |
|---|---|---|---|
| 4,812,677 | * 3/1989 | Perry | 326/14 |
| 5,315,161 | * 5/1994 | Robinson | 307/66 |
| 5,530,877 | 6/1996 | Hanaoka . | |
| 5,586,334 | * 12/1996 | Miyazaki | 713/300 |
| 5,745,391 | 4/1998 | Topor . | |
| 5,832,283 | 11/1998 | Chou et al. . | |
| 6,052,793 | * 4/2000 | Mermelstein | 714/340 |
| 6,226,556 | * 5/2001 | Itkin | 700/21 |

* cited by examiner

Primary Examiner—Robert Beausoleil
Assistant Examiner—Bryce P. Bonzo
(74) Attorney, Agent, or Firm—Robert E. Bushnell, Esq.

(57) ABSTRACT

The present invention comprises a power switch, a central processing unit, a memory, a control unit and a power supply unit. The control unit determines whether a booting operation is successfully preformed, when a power switch is turned to the off position, and then, if a booting operation has been successfully performed, outputs a control signal in order to save data and close all active programs and then turn off power. If a booting operation has not been successfully performed, the control unit outputs a control signal in order to instantly turn off power. The power supply unit turns on or off power according to a control signal from the control unit. The present invention pertains to a computer for terminating power without the loss of data and a method thereof which terminates power only after closing all active programs when the computer's power switch is moved to the off position.

26 Claims, 5 Drawing Sheets

COMPUTER FOR TERMINATING POWER WITHOUT THE LOSS OF DATA AND A METHOD THEREOF

CLAIM OF PRIORITY

This application makes reference to, incorporates the same herein, and claims all benefits accruing under 35 U.S.C. §119 from an application entitled A COMPUTER FOR SWITCHING POWER WITHOUT DATA LOSS AND A METHOD THEREFOR earlier filed in the Korean Industrial Property Office on the 24th day of November 1997, and there duly assigned Ser. No. 97-62327, a copy of which is annexed hereto.

BACKGROUND OF THE INVENTION

1. Technical Field

The present invention relates to a computer and a method for terminating power and more particularly to a computer and method for terminating power without the loss of data.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). The se three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

One example of non-volatile memory is read only memory (ROM). Information stored in non-volatile memory can remain unchanged even when there is a power failure. The information stored in non-volatile memory will stay there until it is changed. Read only memory (ROM) is used to store important information such as instructions for the central processing unit (CPU). There are different types of read only memory (ROM) including electrically-erasable-programmable-read-only-memory (EEPROM) chip and flash-read-only-memory (flash-ROM). The flash-ROM can also be referred to as flash memory. There are differences between an EEPROM chip and flash-ROM, as shown below.

Computer systems include a basic input output system (BIOS) which is an especially important program stored in read only memory (ROM). The basic input output system (BIOS) tests a computer every time the computer is powered on. The basic input output system (BIOS) can allocate a computer system's resources automatically, making adjustments needed to accommodate new hardware. Also, the basic input output system (BIOS) governs how system board components interact.

When the computer system is powered on, the basic input output system (BIOS) immediately takes control of the computer system and its components. The first duty of the basic input output system (BIOS) is to perform a series of diagnostic routines called the power on self test (POST) routine, which ensures that every part of the computer system's hardware is functioning properly.

It is possible for a computer system to be turned off accidentally during data processing. When this occurs, there can be a loss of data.

I have found that when a computer is turned off accidentally during data processing, data can be lost and this can be extremely inconvenient. Efforts have been made in processes pertaining to shutting off power in a computer system.

Exemplars of recent efforts in the art include U.S. Pat. No. 5,832,283 for METHOD AND APPARATUS FOR PROVIDING UNATTENDED ON-DEMAND AVAILABILITY OF A COMPUTER SYSTEM issued to Chou et al., U.S. Pat. No. 5,530,877 for APPARATUS FOR PROVIDING CONTINUITY OF OPERATION IN A COMPUTER issued to Hanaoka, and U.S. Pat. No. 5,745,391 for APPARATUS FOR AND METHOD OF TURNING ON AND SHUTTING OFF A COMPUTING DEVICE issued to Topor.

While these recent efforts provide advantages, I note that they fail to adequately provide an apparatus and method for efficiently and conveniently preventing a loss of data during a shut down of a computer system.

SUMMARY OF THE INVENTION

An object of the present invention is to provide a computer for terminating power without the loss of data. An additional object of the present invention is to provide a method thereof which terminates power after closing all active programs when the computer power is off.

To achieve the above-identified objects and others, the present invention comprises a power switch, a central processing unit, a ROM, a memory, a control part and a power supply part. The control part determines whether a booting is successfully performed, when a power switch is turned to the off position, and then, if a booting is successfully preformed, outputs a control signal for saving and closing all active programs and then turning off power. If not, the control part outputs a control signal for instantly turning off power. The power supply part turns on or off power according to a control signal from the control part.

To further achieve the above-identified objects and others, the present invention comprises the steps of determining whether a booting is successfully performed when a power switch is turned to the off position; outputs a control signal for saving and closing all active programs and then turning off power, if a booting is successfully preformed, and also, if not, outputting a control signal for instantly turning off power.

To achieve these and other objects in accordance with the principles of the present invention, as embodied and broadly described, the present invention provides an apparatus, comprising: a switch switching said apparatus between a power-on state and a power-off state; a memory storing first data and second data, said first data corresponding to a current state of an initialization process of said apparatus, said second data corresponding to current processes of said apparatus, said current state of said initialization process being selected from among a first state and a second state;

a power supply unit selectively supplying power to said apparatus; a central processing unit receiving a first control signal causing said central processing unit to save said second data to said memory; and a control unit determining said current state of said initialization process in response to said switch switching said apparatus to said power-off state, said control unit outputting said first control signal to said central processing unit and then outputting a second control signal to said power supply unit when said current state corresponds to said first state, said control unit not outputting said first control signal to said central processing unit and instead outputting said second control signal to said power supply unit when said current state corresponds to said second state, wherein said second control signal causes said power supply unit to stop supplying power to said apparatus.

To achieve these and other objects in accordance with the principles of the present invention, as embodied and broadly described, the present invention provides a method, comprising: when a switch is switched to a power-off state, determining whether an initialization process of an apparatus has been successfully performed; when said initialization process is determined to have been successfully performed, outputting a first control signal to save data and to end processing of routines, and then outputting a second control signal to stop a power supply unit from supplying power to said apparatus; and when said initialization process is determined to have not been successfully performed, outputting said second control signal to stop said power supply unit from supplying the power, and not outputting said first control signal.

To achieve these and other objects in accordance with the principles of the present invention, as embodied and broadly described, the present invention provides a method, comprising: when a switch is switched to a power-off state, determining whether first data corresponds to a first state; when said first data corresponds to said first state, outputting a first control signal from a control unit to a central processing unit to save second data and to end processing of routines, and then outputting a second control signal from said control unit to a power supply unit to stop said power supply unit from supplying power to an apparatus; and when said first data does not correspond to said first state, outputting said second control signal from said control unit to said power supply unit to stop said power supply unit from supplying the power, and not outputting said first control signal.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
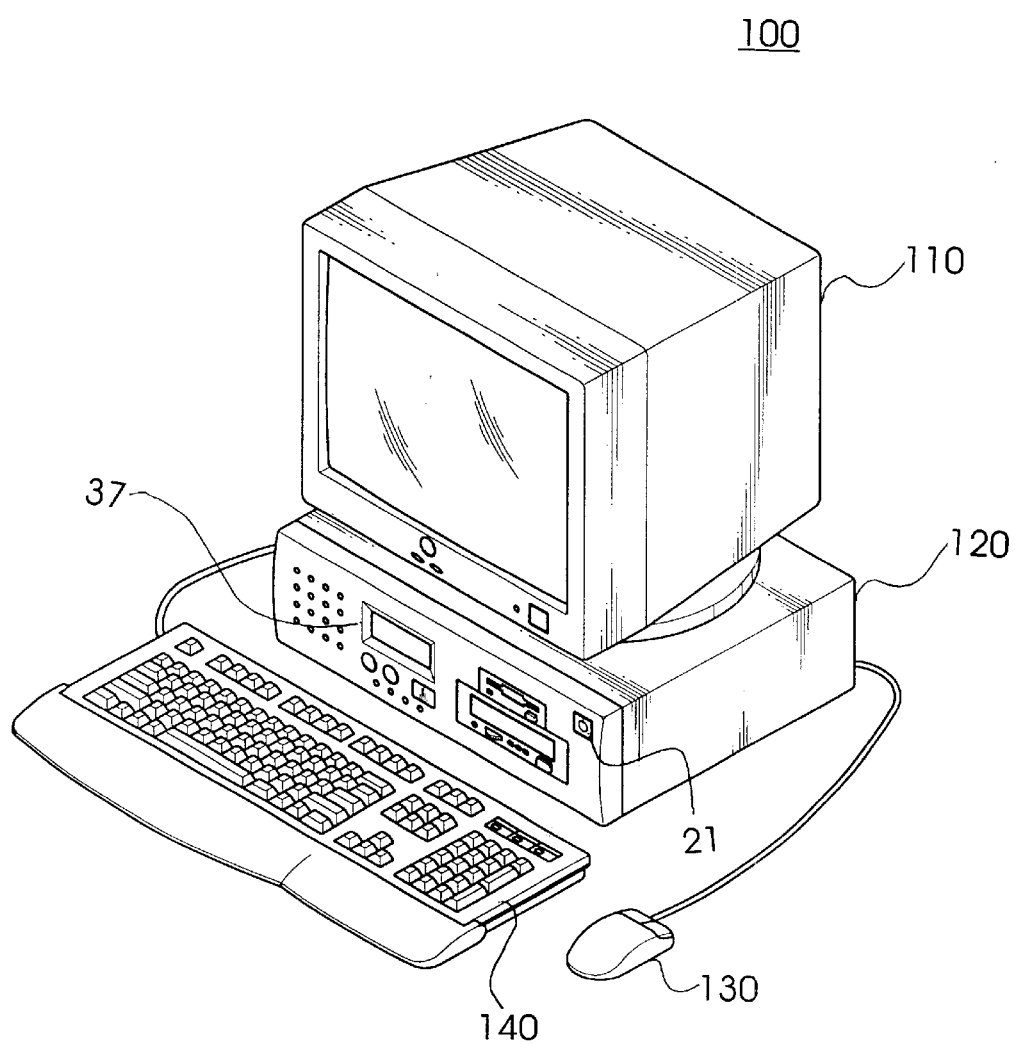
FIG. 1 is a perspective view of a computer.

Referring now more particularly to the accompanying drawings, FIG. 1 shows a perspective view of a computer system 100. The computer system 100 includes a body 120, a monitor 110, a mouse 130, a keyboard 140, a hard disk drive 37, and a power switch 21. As shown in FIG. 1, the computer system 100 is turned on or off according to whether a power switch 21 is pressed or not.

Figure 2:
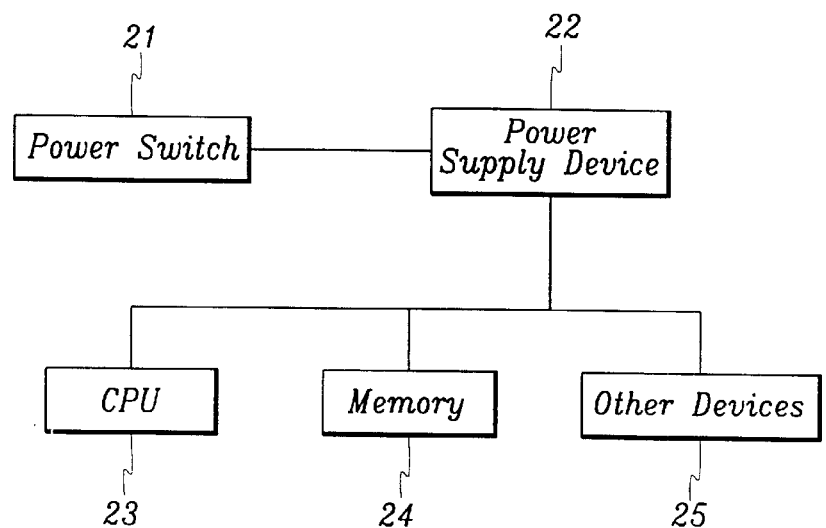
FIG. 2 is a block diagram of the computer of FIG. 1.

Refer now to FIG. 2, which shows a block diagram of the computer of FIG. 1. The FIG. 2 includes a power switch 21, a power supply device 22, a central processing unit (CPU) 23, a memory 24, and other devices 24. As shown in FIG. 2, because the power switch 21 is directly connected to the power supply device 22, when the power switch 21 is turned to the off position, the power supply device 22 instantly terminates the power to a central processing unit 23, a memory 24 and other devices 25.

However, during the operation of the computer as described above, the accidental termination of computer power results in the loss of vital data and in the damage to the systems or hard disk drive 37 of a computer. Some computer systems, such as a server system which normally turns off computers only after saving the necessary data by using a system-closing command, can be extensively damaged.

Figure 3:
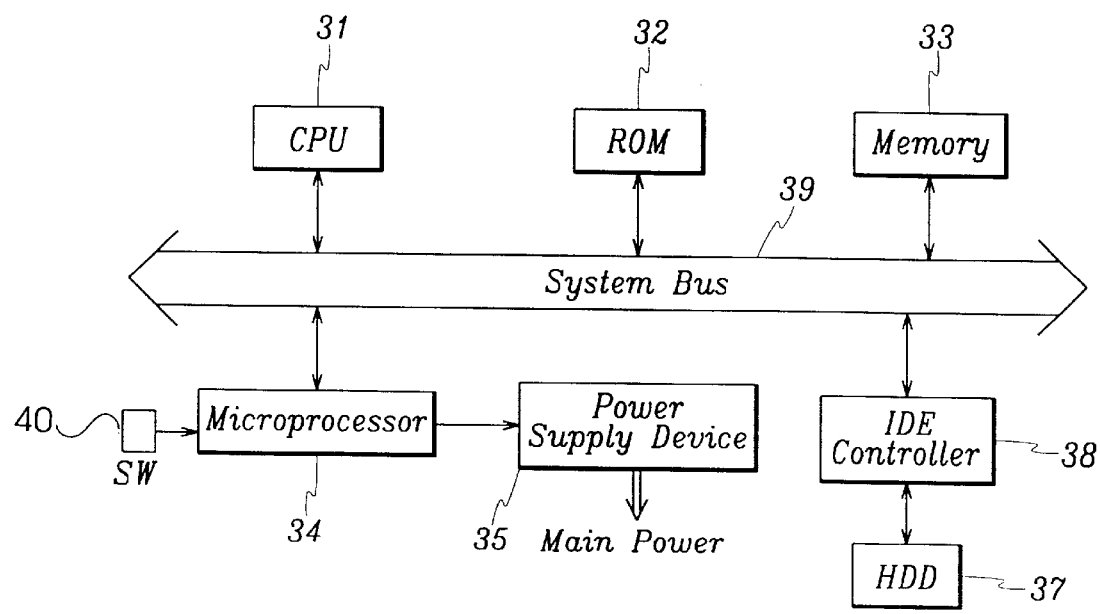
FIG. 3 is a block diagram illustrating a computer for terminating power without the loss of data, in accordance with the principles of the present invention.
Figure 4:
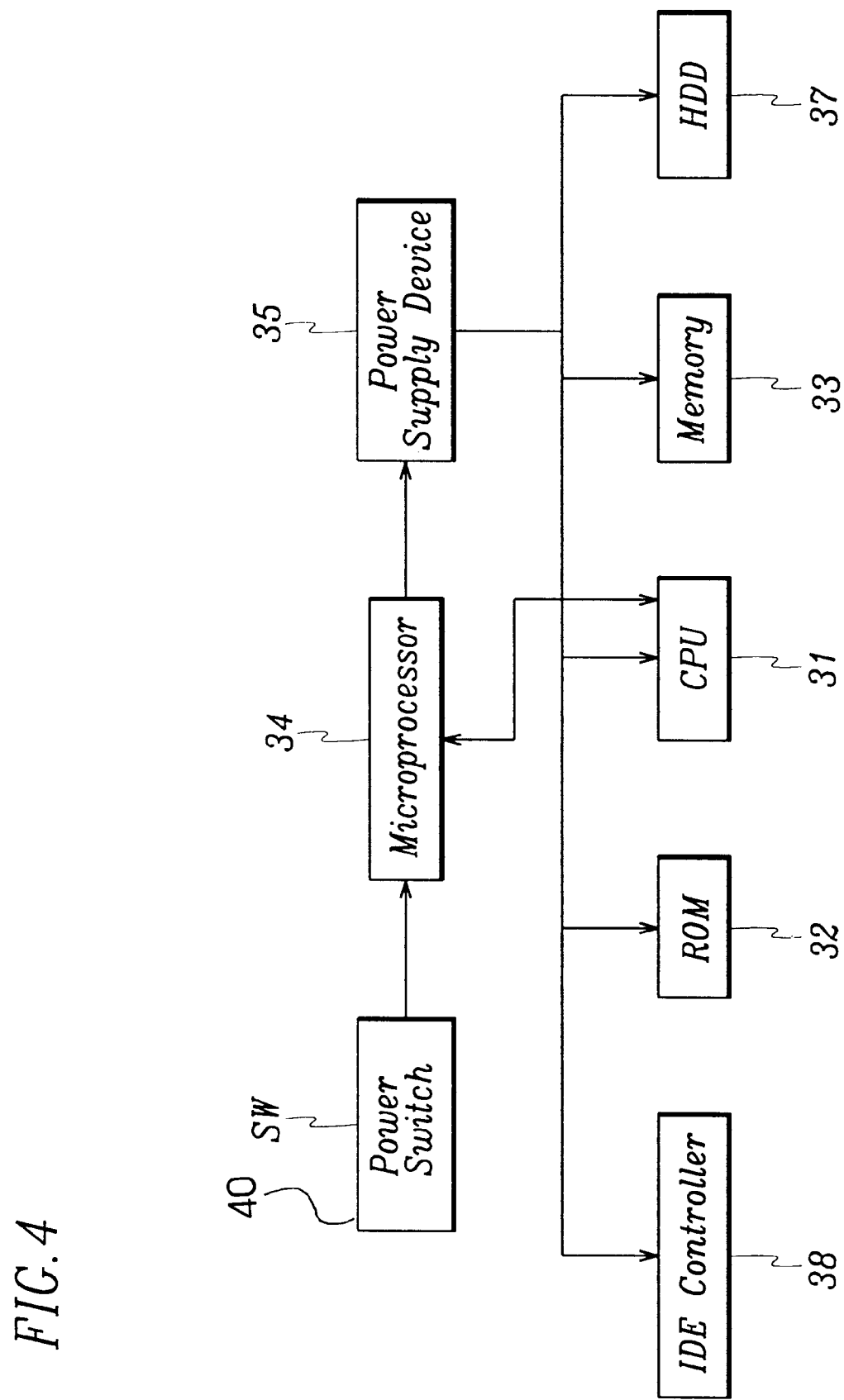
FIG. 4 is a block diagram illustrating how signal lines and power lines are connected to each part of a computer for terminating power without the loss of data, in accordance with the principles of the present invention.
Figure 5:
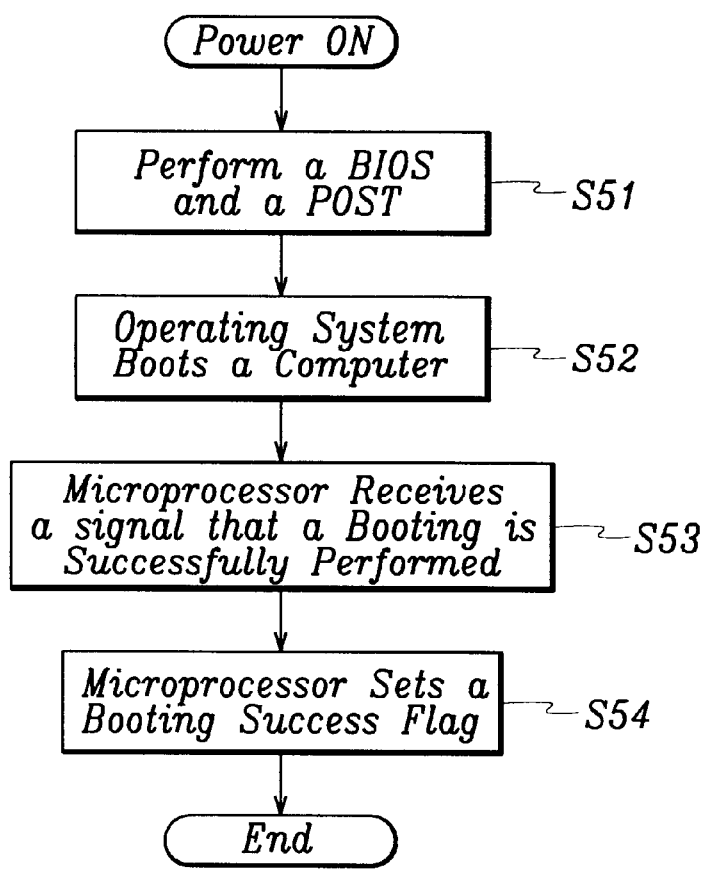
FIG. 5 is a flowchart illustrating a method for terminating power without the loss of data, in accordance with the principles of the present invention, when the power switch is turned to the on position.
Figure 6:
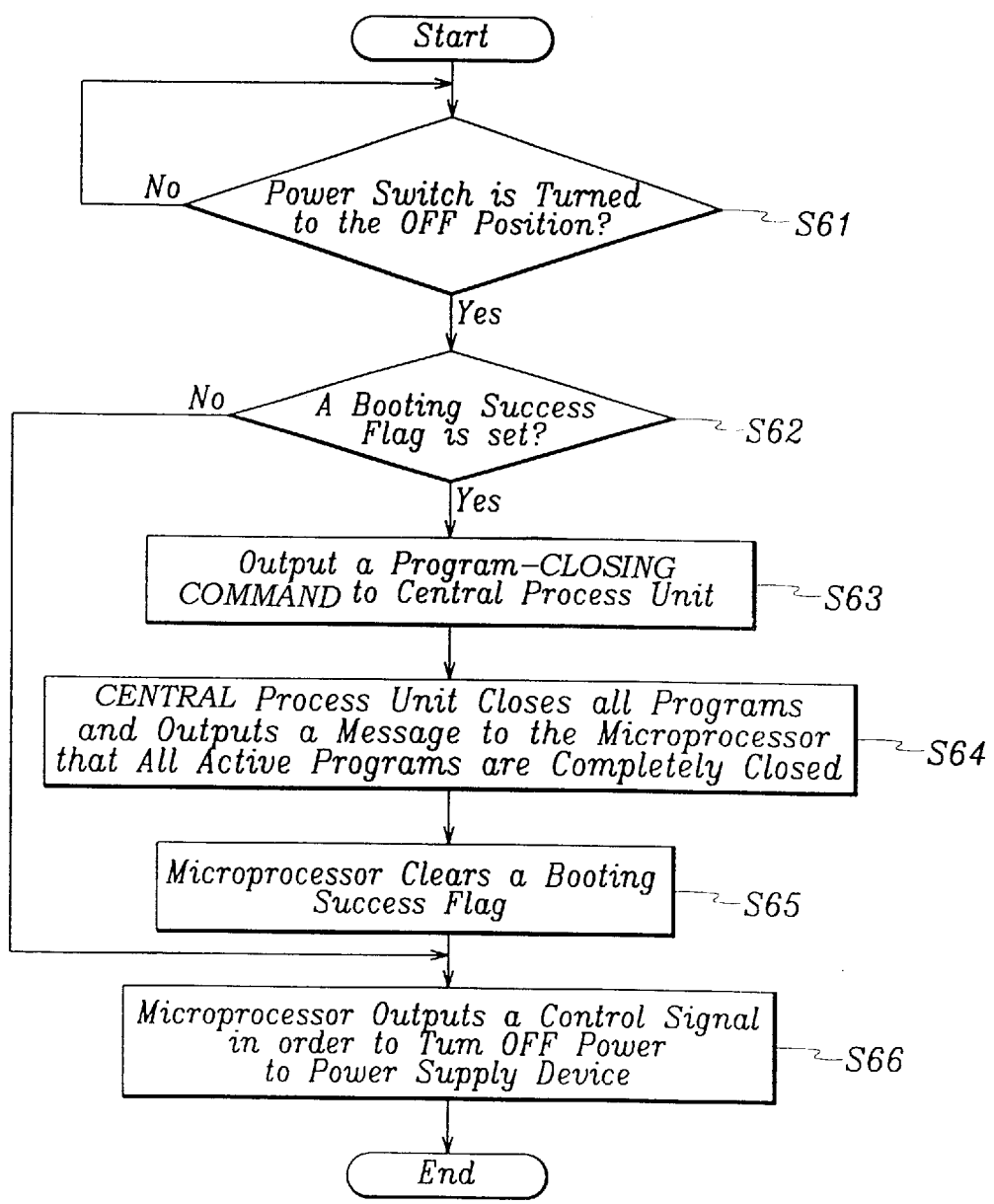
FIG. 6 is a flowchart illustrating a method for terminating power without the loss of data, in accordance with the principles of the present invention, when the power switch is turned to the off position.

The preferred embodiment of the present invention is described below with reference to the accompanying drawings. Turn now to FIGS. 3 through 6. The FIG. 3 is a block diagram illustrating a computer for terminating power without the loss of data, in accordance with the principles of the present invention. FIG. 4 is a block diagram illustrating how signal lines and power lines are connected to each part of a computer for terminating power without the loss of data, in accordance with the principles of the present invention. FIG. 5 is a flowchart illustrating a method for terminating power without the loss of data, in accordance with the principles of the present invention, when the power switch is turned to the on position. FIG. 6 is a flowchart illustrating a method for terminating power without the loss of data, in accordance with the principles of the present invention, when the power switch is turned to the off position.

As shown in FIGS. 3 and 4, a computer for terminating power without the loss of data according to the embodiment of the present invention comprises a read only memory (ROM) 32, a memory 33, a hard disk drive (HDD) 37, an integrated drive electronics (IDE) controller 38, a system bus 39, a power switch (SW) 40, a central processing unit (CPU) 31, a microprocessor 34, and a power supply device 35. The read only memory 32 contains a basic input output system (BIOS) therein. The hard disk drive 37 contains an operating program. The integrated drive electronics controller 38 controls the hard disk drive 37. The power switch SW 40 turns on or off the power to a computer.

With continued reference to FIGS. 3 and 4, when the computer is powered, the central processing unit 31 performs a power on self test (POST) by reading a basic input output system (BIOS) contained in the read only memory 32 to the memory 33, performs a booting by reading an operating program contained in the hard disk drive 37 and then processes the data. The microprocessor 34 outputs control signals for turning on the computer if the power switch SW 40 is turned to the on position. If the power switch SW 40 is turned to the off position, after outputting the control signal for closing all active programs to the central processing unit 31 and then receiving the signal that all active programs are closed from the central processing unit 31, the microprocessor 34 outputs the control signal for turning off the computer. The power supply device 35 supplies or cuts off power by receiving the control signal from the microprocessor 34.

In accordance with the above-identified structure, the operational method for a computer for terminating power without the loss of data according to the embodiment of the present invention will be described as follows. First, as shown in FIG. 4, when the power switch SW 40 is turned to the on position, power is supplied to the entire system from the power supply device 35 and a computer for terminating power without the loss of data begins to operate.

In FIG. 5, at step S51, after the computer begins to operate, the central processing unit 31 performs a power on self test by reading a basic input output system from the read only memory 32 to the memory 33 via the system bus 39. At step S52, the central processing unit 31 performs a booting by reading an operating program contained in the hard disk drive 37 to the memory 33.

In FIG. 5, at step S53, the central processing unit 31 outputs a booting success message to the microprocessor 34. At step S54, the microprocessor 34 sets a booting success flag. The booting success flag is a clear state in an initial state that power is not supplied. Next, an operator performs whatever operations are desired after a booting is completed.

In FIG. 6, at step S61, in accordance with the principles of the present invention, during the operation of a computer, when an operator presses the power switch SW 40 in error or for any other reason, the microprocessor 34 detects whether the power switch SW is pressed. At step S62, the microprocessor 34 determines whether the booting success flag is set. If the booting success flag is detected to be set in step S62, then step S63 is performed next. However, if the booting success flag is detected to be not set in step S62, then step S66 is performed next.

In FIG. 6, at step S63, when the booting success flag is set, the microprocessor 34 outputs a control signal for saving and closing all active programs. At step S64, after saving and closing all active programs, the central processing unit 31 outputs a message to the microprocessor 34 indicating that all active programs are closed. At step S65, the microprocessor 34 clears a booting success flag. After step S65 is performed, then step S66 is performed.

In FIG. 6, at step S66, the microprocessor 34 outputs a control signal for turning off power to the power supply device 35. And then, the power supply device 35 cuts off power supplied to every device of the computer system.

As described above, according to the principles of the present invention, when an operator turns off power of the computer system in error, the present invention can avoid the loss of data, which must be saved, and the present invention also can improve the stability of the computer system. The present invention is very effective in a networked system of computers, like a system of computers networked with a server system which must save the necessary data before cutting off power to the computer.

Having described and illustrated the principles of the invention in the preferred embodiment thereof, it should be apparent the invention can be modified in arrangement and detail without departing from such principles. We claim all modifications and variations coming within the spirit and scope at the following claims.

The foregoing paragraphs describe the details of a computer for terminating power without the loss of data and a method thereof. More particularly, they describe the details of a computer for terminating power without the loss of data and a method thereof which terminates power only after closing all active programs when the computer's power switch is moved to the off position.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a switch switching said apparatus between a power-on state and a power-off state;
   a memory storing first data and second data, said first data corresponding to a current state of an initialization process of said apparatus, said second data corresponding to current processes of said apparatus, said current state of said initialization process being selected from among a first state and a second state;
   a power supply unit selectively supplying power to said apparatus;
   a central processing unit receiving a first control signal causing said central processing unit to save said second data to said memory; and
   a control unit determining said current state of said initialization process in response to said switch switching said apparatus to said power-off state, said control unit outputting said first control signal to said central processing unit and then outputting a second control signal to said power supply unit when said current state corresponds to said first state, said control unit not outputting said first control signal to said central processing unit and instead outputting said second control signal to said power supply unit when said current state corresponds to said second state, wherein said second control signal causes said power supply unit to stop supplying power to said apparatus.

2. The apparatus of claim 1, wherein said control unit comprises a microprocessor outputting a power-on signal to said power supply unit when said switch switches said apparatus to said power-on state, said power-on signal causing said power supply unit to supply power to said apparatus.

3. The apparatus of claim 1, wherein said switch is operable by a user.

4. The apparatus of claim 1, wherein said initialization process of said apparatus corresponds to a booting process of a computer system.

5. The apparatus of claim 4, wherein said current state of said initialization process corresponds to said first state when said booting process has been successfully completed.

6. The apparatus of claim 4, wherein said current state of said initialization process corresponds to said second state when said booting process has not been successfully completed.

7. The apparatus of claim 1, said current processes of said apparatus comprising a plurality of programs and program data being processed by said apparatus.

8. The apparatus of claim 7, wherein said central processing unit stops said processing of said plurality of programs and said program data when said central processing unit receives said first control signal from said control unit.

9. The apparatus of claim 1, wherein said central processing unit outputs a completion signal to said control unit when said central processing unit completes said saving of said second data to said memory.

10. The apparatus of claim 9, when said current state of said initialization process corresponds to said first state, said control unit outputting said second control signal to said power supply unit only when said control unit receives said completion signal from said central processing unit.

11. A method, comprising:
when a switch is switched to a power-off state, determining whether an initialization process of an apparatus has been successfully performed;
when said initialization process is determined to have been successfully performed, outputting a first control signal to save data and to end processing of routines, and then outputting a second control signal to stop a power supply unit from supplying power to said apparatus; and
when said initialization process is determined to have not been successfully performed, outputting said second control signal to stop said power supply unit from supplying the power, and not outputting said first control signal.

12. The method of claim 11, wherein said initialization process of said apparatus corresponds to a booting process of a computer system.

13. The method of claim 11, wherein said outputting of said first and second control signals is performed by a control unit.

14. The method of claim 13, wherein said saving of said data and said ending of said processing of routines are performed by a central processing unit when said central processing unit receives said first control signal from said control unit.

15. The method of claim 14, said central processing unit outputting a completion signal to said control unit when said central processing unit completes said saving of said data and said ending of said processing of routines.

16. The method of claim 15, when said initialization process is determined to have been successfully performed, said control unit outputting said second control signal only when said control unit receives said completion signal from said central processing unit.

17. The method of claim 11, further comprising outputting a power-on signal to said power supply unit when said switch is switched to a power-on state, said power-on signal causing said power supply unit to supply power to said apparatus.

18. The method of claim 11, wherein said determining of whether said initialization process has been successfully performed comprises determining whether a booting success flag is in a first state, said first state corresponding to a successfully preformed initialization process.

19. The method of claim 18, further comprising converting said booting success flag from said first state to a second state when said initialization process is determined to have been successfully performed and said first control signal has been outputted.

20. A method, comprising:
when a switch is switched to a power-off state, determining whether first data corresponds to a first state;
when said first data corresponds to said first state, outputting a first control signal from a control unit to a central processing unit to save second data and to end processing of routines, and then outputting a second control signal from said control unit to a power supply unit to stop said power supply unit from supplying power to an apparatus; and
when said first data does not correspond to said first state, outputting said second control signal from said control unit to said power supply unit to stop said power supply unit from supplying the power, and not outputting said first control signal.

21. The method of claim 20, wherein said determining of whether said first data corresponds to said first state comprises determining whether an initialization process of an apparatus has been successfully preformed, said first data corresponding to said first state when said initialization process of said apparatus has been successfully performed.

22. The method of claim 21, wherein said initialization process of said apparatus corresponds to a booting process of a computer system.

23. The method of claim 20, wherein said saving of said second data and said ending of said processing of routines are performed by said central processing unit when said central processing unit receives said first control signal from said control unit.

24. The method of claim 23, said central processing unit outputting a completion signal to said control unit when said central processing unit completes said saving of said second data and said ending of said processing of routines.

25. The method of claim 24, when said first data corresponds to said first state, said control unit outputting said second control signal only when said control unit receives said completion signal from said central processing unit.

26. The method of claim 25, further comprising converting said first data from said first state to a second state when said first data corresponds to said first state and when said first control signal has been outputted.

* * * * *